United States Patent
Saegusa et al.

(10) Patent No.: US 6,765,060 B2
(45) Date of Patent: Jul. 20, 2004

(54) GRAFT COPOLYMER COMPOSITION AND VINYL CHLORIDE RESIN COMPOSITION CONTAINING THE SAME

(75) Inventors: Kazunori Saegusa, Hyogo (JP); Hirokazu Iguchi, Hyogo (JP); Mamoru Kadokura, Hyogo (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 10/030,105

(22) PCT Filed: May 17, 2001

(86) PCT No.: PCT/JP01/04132

§ 371 (c)(1),
(2), (4) Date: May 14, 2002

(87) PCT Pub. No.: WO01/88032

PCT Pub. Date: Nov. 22, 2001

(65) Prior Publication Data

US 2003/0045634 A1 Mar. 6, 2003

(30) Foreign Application Priority Data

May 17, 2000 (JP) ........................................ 2000-144397

(51) Int. Cl.$^7$ .............................................. C08L 51/00
(52) U.S. Cl. .............................. 525/71; 525/80; 525/86
(58) Field of Search ................................ 525/71, 80, 86

(56) References Cited

U.S. PATENT DOCUMENTS 5,256,733 A * 10/1993 Fleischer et al. ............. 525/64

FOREIGN PATENT DOCUMENTS

| JP | 6-240100 | 8/1994 |
| JP | 9-278978 | 10/1997 |
| JP | 10-324787 | 12/1998 |

* cited by examiner

*Primary Examiner*—Jeffrey Mullis
(74) *Attorney, Agent, or Firm*—Westerman, Hattori, Daniels & Adrian, LLP

(57) ABSTRACT

A graft copolymer composition obtained by mixing a graft copolymer (A) containing a rubbery polymer having a glass transition temperature of not higher than 0° C. as a trunk polymer and containing a alkyl ester of methacrylic acid-base polymer as a graft component, and having a mean particle size of at least 0.15 μm, and a graft copolymer (B) having a means particle size of from 0.03 to 0.13 μm; and a vinyl chloride-base resin composition containing the above described graft copolymer composition as an impact modifier, with excellent impact strength and suitable for use in the productions of pipes, window frames, joints, fences, doors, switch boxes. etc.

19 Claims, No Drawings

GRAFT COPOLYMER COMPOSITION AND VINYL CHLORIDE RESIN COMPOSITION CONTAINING THE SAME

TECHNICAL FIELD

The present invention relates to a graft copolymer composition having a specific particle size distribution. Furthermore, the invention relates to a vinyl chloride-base resin composition containing the graft copolymer composition. More particularly, the invention relates to a graft copolymer composition, which is used for the purpose of imparting am impact strength to molded materials by containing a vinyl chloride-base resin composition, capable of developing a drop-dart strength, which is a typical example of the evaluation of a ductile fracture and a Charpy strength, which is a typical example of the evaluation of a brittle fracture with a good balance. Furthermore, the invention relates to a vinyl chloride-base composition, which has good drop-dart strength and Charpy strength with a good balance, is used for the production of molded materials having an excellent impact strength, and can be suitably used for the production of molded materials such as pipes, window frames, joints, etc., by, for example, extrusion molding, etc. Moreover, the invention relates to a molded material having a good balance of a drop-dart strength and a Charpy strength, and being excellent in the impact strength.

BACKGROUND ART

Hitherto, as the reinforcing agent for improving the impact strength of vinyl chloride-base resins, a so-called MBS resin obtained by graft polymerizing a butadiene-base rubber with methyl methacrylate, styrene, etc., has been developed. Also, as other method of using the MBS resin, about the method of improving the impart strength of vinyl chloride-base resins, various investigations have been made.

However, recently, in the field of utilizing vinyl chloride-base resins, from the relation with the practical strength, it has been required to have high impact strengths in various evaluation methods. For example, in pipes, it has been required to be excellent in both the drop-dart strength, which is the index capable of enduring the damage by impact in the case of transporting or being buried in the ground, and the Charpy strength, which is the index capable of enduring that the pipe is easily damaged by a notch effect of an injured portion in the case of generating an injure and being shocked.

DISCLOSURE OF THE INVENTION

An object of the invention is to provide a resin modifying agent, which is used by being compounded with a vinyl chloride-base resin for imparting am impact strength to the molded materials of the resin and can develop a drop-dart strength and a Charpy strength with a good balance.

Other object of the invention is to provide a vinyl chloride-base resin composition excellent in the impact strength, which gives a molded material having a drop-dart strength and a Charpy strength with a good balance.

Another object of the invention is to provide a molded material which is excellent in the impact strength having a good balance of the drop-dart strength and the Charpy strength.

As the result of making earnest investigations for attaining the above-described objects, the inventors have found the above-described objects can be attained by using a graft copolymer composition having a specific particle size distribution and have accomplished the present invention.

That is, according to the invention, the graft copolymer composition and the vinyl chloride-base resin composition each having the following construction are provided and the above-described objects have been attained.

1. A graft copolymer composition characterized by a mixture of
[1] a graft copolymer (A),
 (i) containing a rubbery polymer (a') at a ratio of from 50 to 90%, by weight obtained by polymerizing monomers comprising from 50 to 100% by weight of a monomer (a-1) constituted of at least one of a butadiene monomer and an alkyl ester of acrylic acid monomer, from 0 to 50% by weight of an aromatic vinyl monomer (a-2), from 0 to 20% by weight of a vinyl monomer (a-3) copolymerizable with the monomer (a-1). and the monomer (a-2), and from 0 to 5% by weight of a non-conjugated multifunctional monomer (a-4) or the mixture (a) thereof (hereinafter, is referred to, for convenience, as a monomer mixture (a)); and having a glass transition temperature of not higher than 0° C.;
 (ii) containing a polymer (b') at a ratio of from 10 to 50% by weight obtained by polymerizing monomers comprising from 10 to 100% weight of a alkyl ester of methacrylic acid monomer (b-1), from 0 to 60% by weight of an alkyl ester of acrylic acid monomer (b-2), from 0 to 90% by weight of an aromatic monomer (b-3), from 0 to 25% by weight of a vinyl cyanide monomer (b-4), and from 0 to 20; by weight of a vinyl monomer (b-5) copolymerizable with the monomer (b-3) and the monomer (b-4) or the mixture (b) thereof (hereinafter, is referred to, for convenience, as a monomer mixture (b)) (wherein, the sum total of the rubbery polymer (a') and the polymer (b') is 100% by weight); and
 (iii) having a mean particle size of at least 0.15 µm; said graft copolymer (A) being obtained by graft copolymerizing the monomer mixture (b) to the rubbery polymer (a') as the trunk polymer, and
[2] a graft copolymer (B),
 (i) containing the above-described rubbery polymer (a') at a ratio of from 50 to 90% by weight;
 (ii) containing the above-described polymer (b') at a ratio of from 10 to 50% by weight (wherein, the sum total of the rubbery polymer (a') and the polymer (b') is 100% by weight), and
 (iii) having a mean particle size of from 0.03 to 0.13 µm; said graft copolymer (B) being obtained by graft copolymerizing the monomer mixture (b) to the rubbery polymer (a') as the trunk polymer; wherein
the graft copolymer (A) occupies at least 5% by weight and less than 50% by weight of the sum total amounts of the graft copolymer (A) and the graft copolymer (B).

2. The graft copolymer composition described in above-described 1, wherein the graft copolymer (A) occupies from 10 to 40% by weight of the sum total amounts of the graft copolymer (A) and the graft copolymer (B).

3. The graft copolymer composition described in above-described 2, wherein the graft copolymer (A) occupies from 15 to 35% by weight of the sum total amounts of the graft copolymer (A) and the graft copolymer (B).

4. The graft copolymer composition described in above-described 1, wherein the mean particle size of the graft copolymer (A) is from 0.16 to 0.5 µm.

5. The graft copolymer composition described in above-described 4, wherein the mean particle size of the graft copolymer (A) is from 0.17 to 0.28 µm.

6. The graft copolymer composition described in above-described 1, wherein the mean particle size of the graft copolymer (a) is from 0.05 to 0.12 μm.

7. The graft copolymer composition described in above-described 1, wherein the monomer (a-1) is constituted of from 0 to 25% by weight of a butadiene monomer and from 75 to 100% by weight of an alkyl ester of acrylic acid monomer (wherein the sum total of both the monomers is 100% by weight).

8. The graft copolymer composition described in above-described 7, wherein the monomer (a-1) is constituted of the alkyl ester of acrylic acid monomer only.

9. The graft copolymer composition described in above-described 1, wherein the monomer mixture (a) does not contain the aromatic vinyl monomer (a-2).

10. The graft copolymer composition described in above-described 1, wherein the monomer mixture (a) does not contain the vinyl monomer (a-3).

11. The graft copolymer composition described in above-described 1, wherein the ratio of the non-conjugated multifunctional monomer (a-4) contained in the monomer mixture (a) is from 0.1 to 3% by weight, 12. The graft copolymer composition described in above-described 1, wherein the alkyl ester of methacrylic acid monomer (b-1) contains a methyl methacrylate monomer at a ratio of from 60 to 100% by weight.

13. The graft copolymer composition described in above-described 12, wherein the alkyl ester of methacrylic acid monomer (b-1) contains methyl methacrylate monomer at a ratio of from 60 to 100% by weight.

14. The graft copolymer composition described in above-described 1, wherein the monomer mixture (b) contains methyl methacrylate monomer (b-1) and the alkyl ester of acrylic acid monomer (b-2) at a ratio of from 60 to 100% by weight and at a ratio of from 0 to 40% by weight, respectively.

15. The graft copolymer composition described in above-described 1, wherein the monomer mixture (b) contains the aromatic vinyl monomer (b-3) at a ratio of from 0 to 10% by weight.

16. The graft copolymer composition described in above-described 15, wherein the monomer mixture (b) does not contain the aromatic vinyl monomer (b3).

17. The graft copolymer composition described in above-described 1, wherein the monomer mixture (b) does not contain the vinyl cyanide monomer (b-4).

18. The graft copolymer composition described in above-described 1, wherein the monomer mixture (b) does not contain the vinyl monomer (b-5).

19. A vinyl chloride-base resin composition characterized by obtained by mixing from 1 to 30% by weight of the graft copolymer composition described in above-described 1 and from 99 to 70% by weight of a vinyl chloride-base resin composition (C) (wherein, the sum total of both the compositions is 100% by weight).

20. A molded material obtained by molding the vinyl chloride-base resin composition described in above-described 19.

BEST MODE FOR CARRYING OUR THE INVENTION

As described above, the graft copolymer composition of the invention is characterized by a mixture of
[1] a graft copolymer (A),
  (i) containing a rubbery polymer (a') at a ratio of from 50 to 90% by weight obtained by polymerizing monomer mixture (a) comprising from 50 to 100% by weight of a monomer (a-1) constituted of at least one of a butadiene monomer and an alkyl ester of acrylic acid monomer, from 0 to 50% by weight of an aromatic vinyl monomer (a-2), a vinyl monomer (a-3) copolymerizable with the monomer (a-1) and the monomer (a-2), and from 0 to 5% by weight of a non-conjugated multifunctional monomer (a-4); and having a glass transition temperature of not higher than 0° C.;
  (ii) containing a polymer (b') at a ratio of from 10 to 50% by weight obtained by polymerizing monomer mixture (b) comprising from 10 to 100% weight of a alkyl ester of methacrylic acid monomer (b-1), from 0 to 60% by weight of an alkyl ester of acrylic acid monomer (b-2), from 0 to 90% by weight of an aromatic monomer (b-3), from 0 to 25% by weight of a vinyl cyanide monomer (b-4), and from 0 to 20% by weight of a vinyl monomer (b-5) copolymerizable with the monomer (b-3) and the monomer (b-4) (wherein, the sum total of the rubbery polymer (a') and the polymer (b') is 100% by weight); and
  (iii) having a mean particle size of at least 0.15 μm; said graft copolymer (A) being obtained by graft copolymerizing the monomer mixture (b) to the rubbery polymer (a') as the trunk polymer, and
[2] a graft copolymer (B),
  (i) containing the above-described rubbery polymer (a') at a ratio of from 50 to 90% by weight;
  (ii) containing the above-described polymer (b') at a ratio of from 10 to 50% by weight (wherein, the sum total of the rubbery polymer (a') and the polymer (b') is 100% by weight), and
  (iii) having a mean particle size of from 0.03 to 13 μm; said graft copolymer (B) being obtained by graft copolymerizing the monomer mixture (b) to the rubbery polymer (a') as the trunk polymer; wherein the graft copolymer (A) occupies at least 5% by weight and less than 50% by weight of the sum total amounts of the graft copolymer (A) and the graft copolymer (B).

One of the large features of the invention is that two kinds of graft copolymers each having a specific different mean particle size are used as impact strength modifiers. It is presumed that by the feature, both of the creased deformation and the shear yield deformation, each largely contributing to the impact energy absorbing by a molded material, are simultaneously caused to a sufficient extent, whereby the drop-dart strength and the Charpy strength can be improved with a good balance.

The graft copolymer (A) used in the invention is a graft copolymer containing the rubbery polymer (a') having a glass transition temperature of not higher than 0° C. as a trunk polymer and the polymer (b') as a graft component.

The graft copolymer of the invention may be formed in a core-shell type, and in this case, the rubbery polymer (a') forming the core layer of the graft copolymer (A) may have a layer structure of one layer only or may have a multilayer structure of two or more layers. Similarly, the polymer (b') forming the shell layer may have a layer structure of one layer only or may have a multilayer structure of two or more layers.

The graft copolymer (A) is usually obtained using the rubbery polymer (a') as the trunk polymer and by graft-copolymerizing the monomer mixture (b) to the rubbery polymer. In many cases, the graft copolymer (A) is obtained by graft copolymerizing the monomer mixture (b) in the existence of the rubber latex (a") containing the rubber polymer (a') as the solid component.

The rubbery polymer (a') is a polymer obtained by polymerizing the monomer mixture (a) containing the monomer (a-1) constituted of at least one of a butadiene monomer and an alkyl ester of acrylic acid monomer (same meaning as "the monomer (a-1) of a butadiene and/or an alkyl ester of acrylic acid" described below), the aromatic vinyl monomer (a-2), the vinyl monomer (a-3) copolymerizable with the monomer (a-1) and the monomer (a-2) (hereinafter, is referred to as "copolymerizable vinyl monomer (a-3)"), and the non-conjugated multifunctional monomer (a-4). By, for example, emulsion polymerizing the monomer mixture (a), a rubber latex (a") containing the rubbery polymer (a') can be obtained. When, the rubbery polymer (a') is obtained by an emulsion polymerization method, the rubbery polymer (a') can be used for the graft polymerization with the monomer mixture (b) in the state of the rubber latex (a") dispersed in an aqueous medium as it is.

In addition, in the invention, for convenience, the monomer mixture (a) is treated as a conception containing the case made of the monomer (a-1) only of a butadiene and/or an alkyl ester of acrylic acid. Furthermore, the above-described monomer mixture (b) is also treated, for convenience, as a conception containing the case made of the monomer (b-1) only.

As the butadiene of the monomer (a-1) of a butadiene and/or an alkyl ester of acrylic acid, 1,3-butadiene is usually used. The alkyl ester of acrylic acid is a component of improving the weatherability of the molded material obtained from the vinyl chloride-base resin composition of the invention without reducing the improvement effect of the impact strength of the molded material. The typical examples of the alkyl ester of acrylic acid include the alkyl esters of acrylic acid having an alkyl group of from 1 to 8 carbon atoms such as, methyl acrylate, ethyl acrylate, butyl acrylate, 2-ethylhexyl acrylate, etc., although the alkyl ester of acrylic acid, which can be used in the invention, is not limited to these monomers. These butadienes or the alkyl esters of acrylic acid each can be used singly or as mixture of two or more kinds thereof.

The using amount of the monomer (a-1) the butadiene and/or the alkyl ester of acrylic acid is from 50 to 100% by weight of the total amounts of the polymer components in the case of obtaining the rubbery polymer (a'), for sufficiently improving the impact strength of the molded materials obtained from the vinyl chloride-base resin composition of the invention.

There is no particular restriction on the ratio of the butadiene and the alkyl ester of acrylic acid contained in the monomer (a-1) of the butadiene and the alkyl ester of acrylic acid. In the case of imparting a high weatherability to the molded material obtained from the vinyl chloride-base resin composition, it is preferred that based on 100% by weight of the sum total amount of the butadiene and the alkyl ester of acrylic acid, the butadiene is from 0 to 25% by weight and the alkyl ester of acrylic acid is from 75 to 100% by weight, it is more preferred that the butadiene is from 0 to 12% by weight and the alkyl ester of acrylic acid is from 88 to 100% by weight, and it is most preferred that the butadiene is from 0% by weight and the alkyl ester of acrylic acid is 100% by weight.

The aromatic vinyl monomer (a-2) has an action of improving the transparency of the molded materials obtained from the vinyl chloride-base resin composition of the invention and is used for controlling such that the difference of the refractive index of the graft copolymer (A) and the refractive index of the vinyl-base rosin (C) becomes as small as possible. Typical examples of the aromatic; vinyl monomer (a-2) include, for example, styrene, $\alpha$-methylstyrene, 1-vinylnaphthalene, and 2-vinylnaphthalene, but the monomer (a-2) is not limited to them. These aromatic vinyl monomers can be used singly or as a combination of two or more kinds thereof.

The using amount of the aromatic vinyl monomer (a-2) is from 0 to 50% by weight of the total amounts of the polymerization components in the case of obtaining the rubbery polymer (a') for avoiding that the using amount of the monomer (a-1) of the butadiene and/or the alkyl ester of acrylic acid is relatively reduced, whereby the rubbery polymer (a') having the desired properties becomes hard to obtain. When the molded material does not require transparency or takes the impact strength seriously, the using amount of the aromatic vinyl monomer (a-2) is preferably from 0 to 25% by weight, and most preferably 0% by weight.

The copolymerizable vinyl monomer (a-3) is a component, which is used for carrying out the fine adjustment of the compatibility of the graft copolymer (A) and the vinyl chloride-base resin (C). Typical examples of the vinyl monomer (a-3) include for example, vinyl cyanide monomers such as acrylonitrile, methacrylonitrile, etc., and 4-hydroxybutyl acrylate, but the vinyl monomer (a-3) used in the invention is not limited to them. These vinyl monomers can be used singly or as a combination of two or more kinds of them.

The using amount of the copolymerizable vinyl monomer (a-3) is from 0 to 20% by weight, preferably from 0 to 10% by weight, and more preferably 0% by weight of the total amounts of the polymerization components in the case of obtaining the rubbery polymer (a') for avoiding that the using amount of the monomer (a-1) of the butadiene and/or the alkyl ester of acrylic acid is relatively reduced, whereby the rubbery polymer (a') having the desired properties becomes hard to obtain.

The non-conjugated multifunctional monomer (a-4) is a component, which is used for forming a crosslinked structure in the rubbery polymer (a'). The typical examples of the non-conjugated multifunctional monomer (a-4) include, for example, divinylbenzene, allyl acrylate, and allyl methacrylate but the monomer (a-4) is not limited to these monomers. As the non-conjugated multifunctional monomer (a-4), in addition to the above-illustrated monomers, a molecule called a macromer having a radical polymerizable functional group at both the terminals thereof, such as $\alpha,\omega$-dimethacryloyloxy polyoxyethylene, etc., can be used. These non-conjugated multifunctional monomers (a-4) can be used singly or as a combination of two or more kinds of them.

The using amount of the non-conjugated multifunctional monomer (a-4) is from 0 to 5% by weight, and preferably from 0.1 to 3% by weight of the total amounts of the polymerization components in the case of obtaining the rubber polymer (a') for avoiding that the using amount of the monomer (a-1) of the butadiene and/or the alkyl ester of acrylic acid is relatively reduced, whereby the rubbery polymer (a') having the desired properties becomes hard to obtain.

There is no particular restriction on the method of obtaining the rubbery polymer (a'), and, for example, a method of compounding the monomer mixture (a) containing the monomer (a-1) of the butadiene and/or the alkyl ester of acrylic acid, the aromatic vinyl monomer (a-2), the vinyl monomer (a-3), and the non-conjugated multifunctional monomer (a-4) in each desired amount with an aqueous medium, a polymerization initiator, an emulsifying agent, etc., and polymerizing the compounded mixture by, for example, an ordinary emulsion polymerization method to obtain the rubbery polymer (a') in a state containing a rubber latex (a") can be employed.

There are no particular restrictions on the addition method of the monomer mixture (a) and the polymerization method in the case of obtaining the rubbery polymer (a"). That is, the polymerization may be carried out by one stage or may be carried out by multi-stages. About the addition method of the monomer mixture (a), the mixture may be added in the lump or may be successively added, or the mixture is separated into two or more stages and in each stage, the mixture may be added in the lump or may be successively added.

In regard to the monomer mixture (a), in addition to the method of previously mixing the monomer (a-1) of the butadiene and/or the alkyl ester of acrylic acid, the aromatic vinyl monomer (a-2), the vinyl monomer (a-3), and the non-conjugated multifunctional monomer (a-4) in each desired amount as described above; the monomer (a-1) of the butadiene and/or the alkyl ester of acrylic acid, the aromatic vinyl monomer (a-2), the vinyl monomer (a-3), and the non-conjugated multifunctional monomer (a-4) in each desired amount are separately or as few combinations of them introduced into a reactor previously containing an aqueous medium, a polymerization initiator, an emulsifying agent, etc., and by mixing with stirring in the reactor, the rubbery polymer (a') can be obtained as the form of a micelle In this case, also, by transferring the condition in the reactor to the condition capable of initiating a polymerization, the monomer mixture (a) is polymerized by, for example, an ordinary emulsion polymerization method, whereby the rubbery polymer (a') can be obtained in a state containing the rubber latex (a").

The glass transition temperature of the rubber polymer (a') thus obtained is controlled to not higher than 0° C., and preferably not higher than –30° C. for that even when a large deformation speed is applied to the molded product finally obtained from the vinyl chloride-base resin composition, the molded product can be sufficiently deformed.

The monomer mixture (b) is comprised of the alkyl ester of methacrylic acid monomer (b-1), the alkyl ester of acrylic acid monomer (b-2), the aromatic vinyl monomer (b-3), the vinyl cyanide monomer (b-4), and the vinyl monomer (b-5) copolymerizable with these monomers (b-1), (b-2), (b-3), and (b-4) (hereinafter, the vinyl monomer (b-5) is referred to as a copolymerizable vinyl monomer (b-5)).

The alkyl ester of methacrylic acid monomer (b-1) is a component used for improving the impact strength of the molded product finally obtained from the vinyl chloride-base resin composition of the invention. The typical examples of the alkyl ester of methacrylic acid monomer (b-1) include, for example, alkyl esters of methacrylic acid having from 1 to 5 carbon atoms such as methyl methacrylate, ethyl methacrylate, and butyl methacrylate, but the alkyl ester of methacrylic acid monomer (b-1) is not limited to these monomers. These alkyl esters of methacrylic acid can be used singly or as a combination of two or more kinds of them.

The using amount of the alkyl ester of methacrylic acid monomer (b-1) is from 10 to 100% by weight for sufficiently improving the impact strength of the molded product finally obtained.

By incorporating methyl methacrylate to the alkyl ester of methacrylic acid monomer (b-1) in a ratio of preferably from 60 to 100% by weight, and more preferably from 80 to 100% by weight, the impact strength of the molded product finally obtained can be particularly improved.

The alkyl ester of acrylic acid monomer (b-2) is a component used for improving the impact strength of the molded product finally obtained by accelerating that the graft copolymer is dispersed well in the vinyl chloride-base resin (C) in the molded product by controlling the softening temperature of the graft component in the graft copolymer (A). The typical examples of the alkyl ester of acrylic acid monomer (b-2) include, for example, the alkyl esters of acrylic acid having an alkyl group of from 2 to 12 carbon atoms, such as ethyl acrylate, butyl acrylate, 2-ethylhexyl acrylate, etc., but the alkyl ester of acrylic acid monomer (b-2) used in the invention is not limited to these monomers. These alkyl esters of acrylic acid can be used singly or as a combination of two or more kinds of them.

The using amount of the alkyl ester of acrylic acid monomer (b-2) is from 0 to 60% by weight of the total amounts of the monomer mixture (b) for avoiding that the using amount of the alkyl ester of methacrylic acid monomer (b-1) is relatively reduced, whereby the impact,strength of the molded product finally obtained is not sufficiently improved.

For attaining the good dispersion of the graft copolymer in the Vinyl chloride-base resin (C) in the molded product finally obtained with a good balance while sufficiently maintaining the adhesion of the graft copolymer (A) and the vinyl chloride-base resin (C), it is preferred that as the total amounts of the alkyl ester of methacrylic acid monomer (b-1) and the alkyl ester of acrylic acid monomer (b-2) contained in the monomer mixture (b) is 100% by weight, the ratio of the alkyl ester of methacrylic acid monomer (b-1) is from 60 to 100% by weight and the ratio of the alkyl ester of acrylic acid monomer (b-2) is from 0 to 40% by weight.

The aromatic vinyl monomer (b-3) is a component having an action of improving the transparency of the molded product finally obtained and being used for controlling that the difference of the refractive index of the graft copolymer (A) and the refractive index of the vinyl chloride-base resin (C) is as small as possible. The typical examples of the aromatic vinyl monomer (b-3) include, for example, the monomers illustrate above as the typical examples of the aromatic vinyl monomer (b-2), but the aromatic vinyl monomer (b-3) is not limited to these monomers. These aromatic vinyl monomers can be used singly or as a combination of two or more kinds thereof.

The using amount of the aromatic vinyl monomer (b-3) is from 0 to 90% by weight, preferably from 0 to 10% by weight, and most preferably 0% by weight for avoiding that the using amount of the alkyl ester of methacrylic acid monomer (b-1) is relatively reduced, whereby the impact strength of the molded product finally obtained is not sufficiently improved.

The vinyl cyanide monomer (b-4) is a component used for carrying out the fine adjustment of the compatibility of the graft Copolymer (A) and the vinyl chloride-base resin (C). The typical examples of the vinyl cyanide monomer (b-4) include, for example, acrylonitrile and methacrylonitrile but the vinyl cyanide monomer (b-4) is not limited to these monomers, These vinyl cyanide monomers can be used singly or as a combination of two or more kinds of them.

The using amount of the vinyl cyanide monomer (b-4) is from 0 to 25% by weight, and most preferably 0% by weight to the total amounts of the monomer mixture (b) for avoiding that the using amount of the alkyl ester of methacrylic acid monomer (b-1) is relatively reduced, whereby the impact strength of the molded product finally obtained is not sufficiently improved.

The vinyl monomer (b-5) is a component used for controlling the workability at molding the vinyl chloride-base resin composition. The typical examples of the vinyl monomer (b-5) include, for example, methyl acrylate, 4-hydroxybutyl acrylate, and glycidyl methacrylate but the vinyl monomer (b-5) is not limited to these monomers. These vinyl monomers can be used singly or as a combination of two or more kinds of them.

The using amount of the copolymerizable vinyl monomer (b-5) is from 0 to 20% by weight, preferably from 0 to 10% by weight, and most preferably 0% by weight to the total amounts of the monomer mixture (b) for avoiding that the using amount of the alkyl ester of methacrylic acid monomer (b-1) is relatively reduced, whereby the impact strength of the molded product finally obtained is not sufficiently improved.

As already described above, the graft copolymer (A) used in the invention is obtained using the rubbery polymer (a') as a trunk polymer and graft copolymerizing the monomer mixture (b) to the rubbery copolymer (a'). The monomer mixture (b) gives a polymer (b') as the result of the graft copolymerization.

About the using ratio of the rubbery polymer (a') and the monomer mixture (b) t from the view point of sufficiently improving the impact strength of the molded product finally obtained from the vinyl chloride-base resin composition of the invention, the rubbery polymer (a') is at least 50% by weight, and preferably at least 60% by weight, and on the other hand, the monomer mixture (b) is not more than 50% by weight, and preferably not more than 40% by weight. Also, for avoiding that the adhesion of the graft copolymer (A) and the vinyl chloride-base resin (C) is lost and the impact strength of the molded product finally obtained from the vinyl chloride-base resin composition of the invention is not sufficiently improved, the ratio of the rubbery polymer (a') and the monomer mixture is controlled such that the rubbery polymer (a') becomes not more than 90% by weight, and preferably not more than 87% by weight, and on the other hand, the monomer mixture (b) becomes at least 10% by weight, and more preferably at least 13% by weight. In this case, the sum total amount of both components is 100% by weight.

There is no particular restriction on the method of obtaining the graft copolymer (A) and as a method of adding the monomer mixture (b) containing the alkyl ester of methacrylic acid monomer (b-1), the alkyl ester of acrylic acid monomer (b-2), the aromatic vinyl monomer (b-3), the vinyl cyanide monomer (b-4), and the vinyl monomer (b-5) in each desired amount to the rubber latex (a") containing the rubbery polymer (a') having the glass transition temperature of not higher than 0° C. controlled as described above, after compounding a polymerization initiator, etc., polymerizing the mixture by an ordinary polymerization method, and obtaining a powdery graft copolymer from the graft copolymer latex thus obtained can be employed.

In addition, there are no particular restrictions on the addition method of the monomer mixture (b) and the polymerization method. That is, the polymerization may be carried out by one stage or may be carried out by multi-stages. About the addition of the monomer mixture (a), the mixture may be added in the lump, may be successively added, or the mixture is separated into two or more stages and in each stage, the mixture may be added in the lump or may be successively added.

The mean particle size of the graft copolymer (A) thus obtained is at least 0.15 µm, and preferably at least 0.16 µm for sufficiently generating creaser which makes an important function for the Charpy strength. The upper limit of the mean particle size is preferably not larger than 0.5 µm on considering the time required for the synthesis of the graft copolymer (A) and the yield thereof. The more preferred range of the mean particle size is at least 0.17 µm and not larger than 0.28 µm.

In addition, as the method of obtaining the graft copolymer (A) having the mean particle size of at least about 0.15 µm, various methods can be employed. For example, there are a method of using the rubber latex (a") containing the rubbery polymer (a') previously having the mean particle size of about 0.15 µm; a method of adding an acid or a salt, etc., to the rubber latex (a") containing the rubbery polymer (a') having the mean particle size of not larger than about 0.1 µm to increase the mean particle size to at least about 0.15 µm; etc.

The graft copolymer (B), which is used in the invention, is a graft copolymer obtained usually using the above-described rubbery polymer (a') as a trunk polymer and graft copolymerizing the monomer mixture (b) forming the polymer (b'), which is a graft component, to the rubbery polymer (a') as the case of obtaining the graft copolymer (A). In many cases, the graft copolymer (B) is obtained by polymerizing the monomer mixture (b) in the existence of the rubber latex (a") containing the rubbery polymer (a') as a solid component.

As the rubbery polymer (a'), a polymer obtained by compounding the polymerization components containing the monomer (a-1) of the butadiene and/or the alkyl ester of acrylic acid, the aromatic vinyl monomer (a-2), the vinyl monomer (a-3), and the non-conjugated multifunctional monomer (a-4) in each desired amount in the above-described ranges of the using amounts with a polymerization initiator, an emulsifying agent, etc., and polymerizing by, for example, an ordinary emulsion polymerization method, etc., as used in the case of obtaining the graft polymer (A) is used. In the case of obtaining the rubbery polymer (a') by an emulsion polymerization, the rubbery polymer (a') can be used for the graft copolymerization with the monomer mixture (b) in the state of the rubber latex of being dispersed in an aqueous medium as it is.

There is no particular restriction on the polymerization method of the monomer mixture (a) in the case of obtaining the rubbery polymer (a'), that is, as the case of obtaining the graft copolymer (A), the polymerization may be carried out in one stage or may be carried out by multi-stages. About the addition method of the monomer mixture (a), the mixture may be added in the lump or may be successively added, or the mixture is separated into two or more stages and in each stage, the mixture may be added in the lump or may be successively added as the case of obtaining the graft copolymer (A). That is, there is also no particular restriction on the addition method of the monomer mixture (a)

The glass transition temperature of the rubbery polymer (a') thus obtained is not higher than 0° C., and preferably not higher than −30° C. for that even when a large deformation speed is added to the molded product finally obtained, the molded product can be sufficiently deformed.

For the monomer mixture (b), as the monomer mixture used in the case of the graft copolymer (A) described above, the alkyl ester of methacrylic acid monomer (b-1), the alkyl ester of acrylic acid monomer (b-2), the aromatic vinyl monomer (b-3), the vinyl cyanide monomer (b-4), and the copolymerizable vinyl monomer (b-5) are used in each desired amount in the above-described ranges of the using amounts.

About the using ratios of the rubbery polymer (a') and the monomer mixture (b), for sufficiently improving the impact strength of the molded product finally obtained from the vinyl chloride-base resin composition of the invention, the rubbery polymer (a') is at least 50% by weight, and preferably at least 60% by weight, and on the other hand, the monomer mixture (b) is not more than 50% by weight, and preferably not more than 40% by weight. Also, for avoiding that the adhesion of the graft copolymer (A) and the vinyl chloride-base resin (C) is lost and the impact strength of the molded product finally obtained from the vinyl chloride-base resin composition of the invention is not sufficiently improved, the rubbery polymer (a') is not more than 90% by weight, and preferably not more than 87% by weight, and on the other hand, the monomer mixture (b) is at least 10% by weight, and more preferably at least 13% by weight. In this case, the sum total amount of both components is 100% by weight.

As the method of obtaining the graft copolymer (B), as the case of obtaining the graft copolymer (A) described above, a method of adding the monomer mixture (b) to the rubber latex (a") containing the rubbery polymer (a') having the glass transition temperature of not higher than 0° C. controlled as described above, and after compounding with a polymerization initiator, etc., polymerizing the mixture by an ordinary polymerization method to obtain the powdery graft copolymer from a graft copolymer latex obtained can be employed.

In addition, there are no particular restrictions on the addition method of the monomer mixture (b) and the polymerization method. That is, the polymerization may be carried out by one stage or may be carried out by multi-stages. About the addition method of the monomer mixture (b), the mixture may be added in the lump or may be 9successively added, or the mixture is separated into two or more stages and in each stage, the mixture may be added in the lump or may be successively added.

The mean particle size of the graft copolymer (B) thus obtained is at least 0.03 μm, and preferably at least 0.05 μm from the view point of stably producing the graft copolymer (B); and also, the mean particle size thereof is not larger than 0.13 μm, and preferably not larger than 0.12 μm from the view point of keeping the distances among the small particles, which is liable to cause shearing yield important for the drop-dart strength.

For obtaining the graft copolymer (B) having a mean particle size of from 0.03 to 0.13 μm, for example, the rubbery polymer (a') previously having a mean particle size of from about 0.03 to 0.13 μm may be used, or as the case of the graft copolymer (A), the particle sizes may be controlled by an acid or a salt, etc.

The graft copolymer composition of the invention contains the graft copolymer (A) and the graft copolymer (B). The ratio of the graft copolymer (A) occupying the sum total amounts of the graft copolymer (A) and the graft copolymer (B) is at least 5% by weight and less than 50% by weight, preferably from 10 to 40% by weight, and more preferably from 15 to 35% by weight for imparting a drop-dart strength, which is a typical example of the evaluation of a ductile fracture and a Charpy strength, which is a typical example of the evaluation of a brittle fracture to the vinyl chloride-base resin composition obtained with a good balance.

The graft copolymer composition containing the graft copolymer (A) and the graft copolymer (B) in the above-described ratio can be used as am impact modifier for vinyl chloride-base resins.

As a method of obtaining the graft copolymer composition of the invention, for example, after mixing a desired amount of a latex containing the graft copolymer (A) and a desired amount of a latex containing the graft copolymer (B), the mixture is coagulated followed by applying a heat treatment, dehydration treatment, and drying treatment, or by subjecting the latex mixture to a spray drying treatment, or after coagulating the latex mixture, by subjecting the coagulated mixture to a dehydration treatment, or further after coagulating the mixture, by subjecting the mixture to a dehydration treatment and melting, etc., the graft copolymer composition of the invention can be obtained as a powder or pellets, etc. Also, by separately coagulating each of the latex containing the graft copolymer (A) and the latex containing the graft copolymer (B) and subjecting each coagulated latex to a heat treatment, a dehydration treatment, a drying treatment, etc., or by subjecting each latex to a spray drying treatment, or after Coagulating each latex, by subjecting the coagulated latex to a dehydration treatment, or after coagulating each latex, by subjecting the coagulated latex to dehydration treatment and melting to form each powder or pellets, and then by mixing the powders or the pellets in the each desired amount, the graft copolymer composition can be obtained.

That is, the mixture of the graft copolymer (A) and the graft copolymer (B) may be carried out by a method of mixing the latexes of these graft polymers, or the slurries obtained by coagulating these latexes, or the powders each separately isolated from each slurry; and also may be carried out by a method of after coagulating the latex containing one of the graft copolymer (A) and the graft copolymer (B), the latex containing the other graft copolymer is added to the coagulated latex, the coagulation is further proceeded, and applying a heat treatment, a dehydration treatment, and a drying treatment.

However, in a method of after mixing a desired mount of the rubber latex (a") containing the rubbery copolymer (a') having a mean particle size of at least 0.15 μm and a desired amount of the rubber latex (a") containing the rubbery polymer (a') having a mean particle size of not larger than 0.13 μm, the monomer mixture (b) is graft copolymerized with the mixture, it is difficult to control the distributing amount of the monomer mixture (b) to each rubber polymer (a') having the each mean particle size at the graft copolymerization and as the result thereof, it is difficult to obtain a desired graft copolymer. Thus, the above-described method is not suitable for a method of obtaining the graft copolymer composition of the invention.

The graft copolymer composition of the invention can, if necessary, contain other additives such as a stabilizer, a filler, a pigment, etc.

The vinyl chloride-base composition of the invention is comprised of the graft copolymer composition of the invention and the vinyl chloride-base resin (C) as described above. The vinyl chloride-base resin (C) used in the invention may be a resin of the vinyl chloride homopolymer, or may be a resin made of a copolymer of a vinyl chloride monomer and other monomer copolymerizable with the vinyl chloride monomer, and also may be a blend of a vinyl chloride resin and a resin made of other polymer. The vinyl chloride-base resin (C) preferably contains at least 70% by weight of a repeating unit originated in the vinyl chloride monomer in the whole repeating units. The mean polymerization degree of the vinyl chloride-base resin (C) is preferably from about 600 to 1500 on considering the workability at molding.

In the vinyl chloride-base resin composition of the invention, the ratio of the graft copolymer composition occupying the sum total amounts of the graft copolymer composition and the vinyl chloride-base resin (C) is from 1 to 30% by weight, preferably from 1.2 to 25% by weight, and more preferably from 1.5 to 20% by weight from the view point of preventing the occurrence of deformation such as deflection by keeping an appropriate rigidity while properly developing the impact strength of the molded product finally obtained from the vinyl chloride-base resin composition.

There is no particular restriction on the method of obtaining the vinyl chloride-base resin composition of the invention and, for example, a method of mixing the graft copolymer composition, the vinyl chloride-base resin (C), and, if necessary, other additives using, for example, a blender, etc., can be employed. As the case may be, a method of after mixing them using a blender while raising the temperature to from about 90 to 140° C., cooling the mixture can be used.

In addition, in the case of obtaining the vinyl chloride-base resin composition of the invention, after preparing the graft copolymer composition by previously mixing the graft copolymer (A) and the graft copolymer (B), the mixture may be mixed with the vinyl chloride-base resin (C); or the graft copolymer (A), the graft copolymer (B), and the vinyl chloride-base resin (C), which are separately isolated as the powders or the pellets thereof, may be simultaneously mixed; or after mixing one of the graft copolymer (A) and the graft copolymer (B) with the vinyl chloride-base resin (C), the mixture may be mixed with another graft copolymer. In the case of employing any method described above, the vinyl chloride-base resin composition may be prepared such that the graft copolymer composition of the invention and the vinyl chloride-base resin (C) are contained in the definite amounts.

In addition, for the vinyl chloride-base resin composition of the invention, in addition to the graft copolymer composition [the graft copolymer (A) and the graft copolymer (B)] and the vinyl chloride-base resin (C), additives such as, for example, a stabilizer, a lubricant, an filler such as calcium carbonate, etc., and a pigment such as carbon black, etc., can be used in the ranges of not reducing the attainment of the objects of the invention.

Since the vinyl chloride-base resin composition of the invention thus obtained has the drop-dart strength and the Charpy strength with a good balance and is excellent in the impact strength, the composition can be suitably used in the case of producing molded materials such as, for example, pipes, window frames, fences, doors, switch boxes, etc., by ordinary extrusion molding method, injection molding method, etc.

The molded material of the invention is molded from the vinyl chloride-base resin composition of the invention described above. Accordingly, the molded material of the invention has the drop-dart strength and the Charpy strength with a good balance and is excellent in the impact strength. There is no particular restriction on the molding method and, for example, ordinary extrusion molding method, injection molding method, etc., can be used. As the molded materials of the invention, there are, for example, pipes, window frames, fences, doors, switch boxes, and members constituting them, etc.

EXAMPLES

Then, the invention is explained based on the examples but the invention is not limited to these examples.

Example 1

In a polymerization vessel equipped with a stirrer were charged 200 parts (by weight, and so forth) of water, 0.5 part of sodium oleate, 0.002 part of ferrous sulfate ($FeSO_4 \cdot 7H_2O$), 0.005 part of ethylenediaminetetraacetic acid (hereinafter, is referred to as "EDTA").2Na, 0.2 part of sodium formaldehydesulfoxylate, and 0.2 part of potassium tertiary phosphate, and then a mixed liquid of 99 parts of heptyl acrylate, 1 part of divinylbenzene, and 0.1 part of diisopropylbenzene hydroperoxide was continuously added to the mixture at 50° C. over a period of 10 hours. After passing 2.5 hours, 5 hours, and 7.5 hours since the initiation of the polymerization, 0.5 part of sodium oleate was added thereto at each time and post polymerization was carried out for one hour to obtain a rubber latex (R-1) containing a rubber polymer having a polymerization conversion of 99%, a mean particle size of 0.08 μm, and a glass transition temperature of −43° C.

Then, 5 parts (solid components) of the rubber latex (R-1) obtained, 190 parts of water, 0.0019 part of ferrous sulfate ($FeSO_4 \cdot 7H_2O$), 0.0048 part of EDTA.2Na, 0.19 part of sodium formaldehydesulfoxylate, and 0.19 part of potassium tertiary phosphate were charged in a polymerization vessel equipped with a stirrer, and a mixed liquid of 94.05 parts of butyl acrylate, 0.95 part of divinylbenzene, and 0.095 part of diisopropylbenzene hydroperoxide was continuously added to the mixture at 50° C. over a period of 9.5 hours. After passing 2.5 hours, 5 hours, and 7.5 hours since the initiation of the polymerization, 0.2 part of sodium oleate was added thereto at each time and post polymerization was carried out for one hour to obtain a rubber latex (R-2) having a polymerization conversion of 99%, a mean particle size of 0.22 μm, and a glass transition temperature of −43° C.

Furthermore, 240 parts (80 parts of solid components) of the above-described rubber latex (R-2), 200 parts of water, 0.002 part of ferrous sulfate ($FeSO_4 \cdot 7H_2O$), 0.004 part of EDTA.2Na, and 0.1 part of sodium formaldehydesulfoxylate were charged in a polymerization vessel equipped with a stirrer, and after mixing, the inside temperature of the mixture was raised to 70° C. Thereafter, a mixed liquid of 18 parts of methyl methacrylate, 2 parts of ethyl acrylate, and 0.1 part of cumene hydroperoxide was continuously added thereto over a period of 2 hours and 30 minutes, and a post polymerization was carried out for one hour to obtain a graft copolymer latex (G-1) having a mean particle size of 0.24 μm.

The graft copolymer latex (G-1) obtained was coagulated with sulfuric acid and subjected to a heat treatment, a dehydration treatment, and a drying treatment to obtained a powdery graft copolymer (A-1).

On the other hand, 240 parts (80 parts of solid components) of the rubber latex (R-1), 200 parts of water, 0.002 parts of ferrous sulfate ($FeSO_4 \cdot 7H_2O$), 0.004 part of EDTA.2Na, and 0.1 part of sodium formaldehydesulfoxylate were charged in a polymerization vessel equipped with a stirrer, and after mixing, the inside temperature of the mixture was raised to 70° C. Thereafter, a mixed liquid of 18 parts of methyl methacrylate, 2 parts of ethyl acrylate, and 0.1 part of cumene hydroperoxide was continuously added thereto over a period of 2 hours and 30 minutes and a post polymerization was carried out for one hour to obtain a graft copolymer latex (G-2) having a mean particle size of 0.09 μm.

The graft copolymer latex (G-2) obtained was coagulated with sulfuric acid and subjected to a heat treatment, a dehydration treatment, and a drying treatment to obtain a powdery graft copolymer (B-1).

In a blender were placed 6 parts of mixed resins of 20% by weight of the graft copolymer (A-1) and 80% by weight of the graft copolymer (B-1), 1.5 parts of dioctyltin mercaptide (stabilizer, TM-188J: trade name, manufactured by Katsuta Kako K.K.), 100 parts of a vinyl Chloride resin (mean polymerization degree 1100, S-1001 trade name, manufactured by KANEKA CORPORATION), and 3.5 parts of a lubricant (RX-890; trade name, manufactured by Daikyo Kasei Kogyo K.K.), and after mixing them while raising the temperature to 130° C., the mixture was cooled to room temperature to obtained a vinyl chloride-base resin composition.

The vinyl chloride-base resin composition obtained was supplied to extrusion molding using an extruder (Conical Extruder, TEC-55DV, manufactured by TOSHIBA MACHINE CO., LTD.) under the following conditions (set temperatures) to produce pipes each having a width of 1 inch (about 2.54 cm) and a thickness of about 3 mm.

| [Molding conditions (set temperatures)] | | |
|---|---|---|
| (Cylinder) | C1 | 180° C. |
|  | C2 | 195° C. |
|  | C3 | 195° C. |
|  | C4 | 195° C. |
| (Adapter) |  | 180° C. |
| (Die) | D1 | 185° C. |
|  | D2 | 190° C. |
|  | D3 | 195° C. |
|  | D4 | 200° C. |
| (Screw) |  | 110° C. |

Then, about the properties of the pipe obtained, the drop-dart strength and the Charpy strength were determined by the following methods. The results obtained are shown in Table 1 below.
(a) Drop-dart Strength;
Using a weight of 20 kg, the weight is vertically dropped onto the pipe at 0° C., and the height $H_{50}$ (m) of dropping the weight, by which half the number of the pipes were broken, was measured.
(b) Charpy Strength.
According to the method described in JIS K7111, the Charpy strength ($kJ/m^2$) was measured (Test piece form: No.1 E•A, width 3 mm, the average value of 20 samples).

EXAMPLE2

By following the same procedure as Example 1 except that 6 parts of the mixed resins of 45% by weight of the graft copolymer (A-1) and 55% by weight of the graft polymer (B-1) were used in place of 6 parts of the mixed resins of the graft copolymer (A-1) and 80% by weight of the graft polymer (B-1) in Example 1, pipes were produced. The properties thereof were measured as in Example 1 and the results are shown in Table 1.

EXAMPLE3

After mixing 10% by weight (solid components) of the graft copolymer latex (G-1) (the graft copolymer (A)) and 90% by weight (solid components) of the graft copolymer latex (G-2) (the graft copolymer (B)) each obtained as in Example 1, the mixture was coagulated with sulfuric acid and subjected to a heat treatment, a dehydration treatment, and a drying treatment to obtain a powdery graft copolymer.

Then, by following the same procedure as Example 1 except that 6 parts of the above-described powdery graft copolymer was used in place of 6 parts of the mixed resins of the graft copolymer (A-1) and 80% by weight of the graft polymer (B-1) in Example 1, a vinyl chloride-base resin composition was obtained. From the vinyl chloride-base resin composition obtained, pipes were produced as in Example 1 and the properties thereof were determined as in Example 1. The results thereof are shown in Table 1.

Comparative Example 1

By following the same procedure as Example 1 except that 6 parts of the graft Copolymer (B-1) only was used in place of 6 parts of the mixed resins of 20% by weight of graft copolymer (A-1) and 80% by weight of the graft copolymer (B-1) in Example 1, a vinyl chloride-base resin composition was obtained. From the vinyl chloride-base resin composition obtained, pipes were produced as in Example 1 and the properties thereof were determined by the same manners as in Example 1. The results thereof are shown in Table 1.

Comparative Example 2

By following the same procedure as Example 1 except that 6 parts of the graft copolymer (A-1) only was used in place of 6 parts of the mixed resins of 20% by weight of graft copolymer (A-1) and 80% by weight of the graft copolymer (B-1) in Example 1, a vinyl chloride-base resin composition was obtained. From the vinyl chloride-base resin composition obtained, pipes were produced as in Example 1 and the properties thereof were determined by the same manners as in Example 1. The results thereof are shown in Table 1.

Comparative Example 3

In a polymerization vessel equipped with a stirrer were charged 29 parts (solid components) of the rubber latex (R-2) obtained by the same manner as in Example 1, 142 parts of water, 0.0014 part of ferrous sulfate ($FeSO_4.7H_2O$), 0.0036 part of EDTA.2Na, 0.14 part of sodium formaldehydesulfoxylate, and 0.14 part of potassium tertiary phosphate, and then, a mixed liquid of 70.29 parts of butyl acrylate, 0.71 part of divinylbenzene, and 0.071 part of diisopropylbenzene hydroperoxide was continuously added thereto at 50° C. over a period of 7.1 hours. After passing 2 hours, 4 hours, and 6 hours since the initiation of the polymerization, 0.08 part of sodium oleate was added thereto at each time and post polymerization was carried out for one hour to obtain a rubber latex (R-3) having a polymerization conversion of 99% and a mean particle size of 0.33 µm.

After mixing 80 parts (solid components) of the above-described rubber latex (R-3), 200 parts of water, 0.002 part of ferrous sulfate ($FeSO_4.7H_2O$), 0.004 part of EDTA.2Na, and 0.1 part of sodium formaldehydesulfoxylate, the inside temperature of the mixture was raised to 70° C. Thereafter, a mixed liquid of 18 parts of methyl methacrylate, 2 parts of ethyl acrylate, and 0.1 part of cumene hydroperoxide was continuously added over a period of 2 hours and 30 minutes, and a post polymerization was carried out for one hour to obtain a graft copolymer latex (G-3) having a mean particle size of 0.37 µm.

The graft copolymer latex (G-3) obtained was coagulated with sulfuric acid and subjected to a heat treatment, a dehydration treatment, and a drying treatment to obtain a powdery graft copolymer (A-2).

Then, by following the same procedure as Example 1 except that 6 parts of the graft copolymer (A-2) was used in place of 6 parts of the mixed resins of 20% by weight of graft copolymer (A-1) and 80% by weight of the graft copolymer (B-1) in Example 1, a vinyl chloride-base resin composition was obtained. From the vinyl chloride-base resin composition obtained, pipes were produced as in Example 1 and the properties thereof were determined by the same manners as in Example 1. The results thereof are shown in Table 1.

Comparative Example 4

By following the same procedure as Example 1 except that 6 parts of the mixed resins of 60% by weight Of the graft copolymer (A-1) and 40% by weight of the graft copolymer (B-1) were used in place of 6 parts of the mixed resins of 20% by weight of graft copolymer (A-1) and 80% by weight of the graft copolymer (B-1) in Example 1, a vinyl chloride-base resin composition was obtained. From the vinyl chloride-base resin composition obtained, pipes were produced as in Example 1 and the properties thereof were determined by the same manners as in Example 1. The results thereof are shown in Table 1.

Comparative Example 5

After mixing 64 parts (solid components) of the rubber latex (R-1) and 16 parts (solid components) of the rubber latex (R-2) each obtained by the same manner as in Example 1 with 200 parts of water, 0.002 parts of ferrous sulfate ($FeSO_4.7H_2O$), 0.004 part of EDTA.2Na, and 0.1 part of sodium formaldehydesulfoxylate, the inside temperature of the mixture was raised to 70° C. Thereafter, a mixed liquid of 18 parts of methyl methacrylate, 2 parts of ethyl acrylate, and 0.1 part of cumene hydroperoxide was continuously added thereto over a period of 2 hours and 30 minutes, and a post polymerization was carried out for one hour to obtain a graft copolymer latex (G-4) having a mean particle size of 0.09 $\mu$m.

The graft copolymer latex (G-4) obtained was coagulated with sulfuric acid and subjected to a heat treatment, a dehydration treatment, and a drying treatment to obtain a powdery graft copolymer (A-3).

Then, by following the same procedure as Example 1 except that 6 parts of the graft copolymer (A-3) was used in place of 6 parts of the mixed resins of 20% by weight of graft copolymer (A-1) and 80% by weight of the graft copolymer (B-1) in Example 1, a vinyl chloride-base resin composition was obtained. From the vinyl chloride-base resin composition obtained, pipes were produced as in Example 1 and the properties thereof were determined by the same manners as in Example 1. The results thereof are shown in Table 1.

EXAMPLE 4

In a pressure polymerization vessel equipped with a stirrer were charged 200 parts of water, 0.04 part of sodium oleate, 0.001 part of ferrous sulfate ($FeSO_4.7H_2O$), 0.005 part of EDTA.2Na, 0.1 part of sodium formaldehydesulfoxylate 0.2 part of potassium tertiary phosphate, 19.8 parts of butadiene, 79.2 parts of butyl acrylate, and 1 part of divinylbenzene, and after raising the temperature of the mixture to 50° C. 0.1 part of di-t-butyl peroxide was added to initiate the polymerization. After passing 1 hour and 30 minutes, 3 hours, and 4 hours and 30 minutes since the initiation of the polymerization, 0.1 part of sodium oleate was added at each time, and after 6 hours since the initiation of the polymerization, a rubber latex (R-4) containing a rubbery polymer having a polymerization conversion of 99%, a mean particle size of 0.24 $\mu$m, and a glass transition temperature of −56° C. was obtained.

Then, 210 parts (70 parts of solid components) of the above-described rubber latex (R-4), 200 parts of water, 0.002 part of ferrous sulfate ($FeSO_4.7H_2O$), 0.004 part of EDTA.2Na, and 0.1 part of sodium formaldehydesulfoxylate were charged in a polymerization vessel equipped with a stirrer, and after mixing them, the inside temperature of the mixture was raised to 70° C. Thereafter, a mixed liquid of 25 parts of methyl methacrylate, 3 parts of butyl acrylate, 2 parts of acrylonitrile, and 0.1 part of cumene hydroperoxide was continuously added thereto over a period of 4 hours and a post polymerization was carried out for one hour to obtain a graft copolymer latex (C-5) having a mean particle size of 0.27 $\mu$m.

The graft copolymer latex (G-5) obtained was coagulated with magnesium chloride and subjected to heat treatment, a dehydration treatment, and a drying treatment to obtain a powdery graft copolymer (A-4).

On the other hand, 200 parts of water, 1.1 parts of sodium oleate 0.001 part of ferrous sulfate ($FeSo_4.7H_2O$), 0.005 part of EDTA.2Na, 0.1 part of sodium formaldehydesulfoxylate, 0.2 part of potassium tertiary phosphate, 19.8 parts of butadiene, 79.2 parts of butyl acrylate, and 1 part of divinylbenzene were charged in a pressure polymerization vessel equipped with a stirrer, and after raising the temperature of the mixture in the vessel to 50° C., 0.1 part of di-t-butyl peroxide was added to initiate the polymerization. After passing 1 hour and 30 minutes, 3 hours, and 4 hours and 30 minutes since the initiation of the polymerization, 0.3 part of sodium oleate was added at each time, and after 6 hours since the initiation of the polymerization, a rubber latex (R-5) containing a rubbery polymer having a polymerization conversion of 99%, a mean particle size of 0.07 $\mu$m, and a glass transition temperature of −56° C. was obtained.

Then, 210 parts (70 parts of solid components) of the above-described rubber latex (R-5), 200 parts of water, 0.002 part of ferrous sulfate ($FeSO_4.7H_2O$), 0.004 part of EDTA.2Na, and 0.1 part of sodium formaldehydesulfoxylate were charged in a polymerization vessel equipped with a stirrer, and after mixing, the inside temperature of the mixture was raised to 70° C. Thereafter, a mixed liquid of 25 parts of methyl methacrylate, 3 parts of butyl acrylate, 2 parts of acrylonitrile, and 0.1 part of cumene hydroperoxide was continuously added thereto over a period of 4 hours, and a post polymerization was carried out for one hour to obtain a graft copolymer latex (G-6) having a mean particle Size of 0.08 $\mu$m.

The graft copolymer latex (G-6) obtained was coagulated with magnesium chloride and subjected to a heat treatment, a dehydration treatment, and a drying treatment to obtain a powdery graft copolymer (B-2).

In a blender were placed 15 parts of the mixed resins of 30% by weight of the graft copolymer (A-4) and 70% by weight of the graft copolymer (B-2), 3 parts of dioctyltin mercaptide (stabilizer, TM-188J: trade name, manufactured by Katsuta Kako K.K.), 100 parts of a vinyl chloride resin (mean polymerization degree 700, S-700: trade name, manufactured by KANEKA CORPORATION), 1 part of a processing aid for vinyl chloride resin (KANE ACE PA-20, manufactured by KANEKA CORPORATION), and 2 parts of a polyethylene wax (AC-6A: trade name, manufactured by Allied Chemical Corporation), and after mixing them while raising the temperature to 120° C., the mixture was cooled to room temperature to obtain a vinyl chloride-base resin composition.

The vinyl chloride-base resin composition obtained was granulated by an 40 mm extruding machine (HV-40-28: trade name) manufactured by TABATA CORPORATION) to obtain pellets.

| [Extrusion conditions (set temperatures)] | | |
| --- | --- | --- |
| (Cylinder) | C1 | 160° C. |
|  | C2 | 170° C. |
|  | C3 | 170° C. |
|  | C4 | 170° C. |
|  | C5 | 170° C. |
| (Die) | D1 | 170° C. |

The pellets obtained were supplied to injection molding using an injection-molding machine (Injection Molding Machine, FD-150, manufactured by Nissei Limited) under the following molding conditions (set temperatures) to obtain an Izod test piece (JIS No. 2A, width 5 mm) and a plate (150 mm×100 mm×3 mm).

| [Injection molding conditions (set temperatures)] | | |
| --- | --- | --- |
| (Cylinder) | C1 | 170° C. |
|  | C2 | 175° C. |
|  | C3 | 180° C. |
| (Nozzle) | NT | 180° C. |
| Cooling |  | 40° C. |

Then, as the properties of the molded materials obtained, the Izod strength and the plane impact strength were determined according to the following methods. The results are shown in Table 2.
(c) Izod Test:
According to the method described in JIS K7110, the Izod strength ($kJ/m^2$) was measured (the mean value of 20 samples)
(d) Plane Impact Test:
Using High•Rate•Impact•Tester (manufactured by Rheometric Co.), ⅝" R impact core, the plate samples were punched at a measurement speed of 5 meters/second and a measurement temperature of 23° C., the occurrence ratio of fractured samples having no brittle cracks (hereinafter, is referred to as ductile fracture ratio. A sample having the higher value of the ductile fracture ratio is determined to have a higher strength) was measured (number of samples was 20).

In addition, in Tables 1 and 2, the contents (% by weight) of the rubbery polymers (a') in the graft copolymer (A) and the graft copolymer (B), each of the mean particle sizes and the mixing method (powder mixing shows that the powdery copolymers are mixed; latex mixing shows that the latexes of the graft copolymers are mixed; and slurry mixing shows that slurries obtained by coagulating the latexes with an acid or a salt are mixed) of the graft copolymer (A) and the graft copolymer (B), and the compounding ratio (the graft copolymer (A) /the graft copolymer (B) (weight ratio)) are shown together.

EXAMPLE 5

Each of the graft copolymer latex (G-5) (graft copolymer (A)) and the graft copolymer latex (G-6) (graft copolymer (B)) obtained by the same manners as in Example 4 was separately coagulated with magnesium chloride to obtain the coagulated slurry (S-1) and the coagulated slurry (S-2) respectively. Then, after mixing 15 parts (solid components) of the coagulated slurry (S-1) and 85 parts (solid components) of the coagulated slurry (S-2), the mixture was subjected to a heat treatment,,a dehydration treatment, and a drying treatment to obtain a powdery graft copolymer.

Then, by following the same procedure as Example 4 except that 15 parts of the above-described powdery graft copolymer in place of 15 parts of the mixed resins of 30% by weight of the graft copolymer (A-4) and 70% by weight of the graft copolymer (B-2) in Example 4, a vinyl chloride-base resin composition was obtained. From the vinyl chloride-base resin composition obtained, Izod test pieces and plates were produced as in Example 4, and the properties of them were determined as in Example 4. The results are shown in Table 2.

EXAMPLE 6

After mixing 35% by weight (solid components) of the graft copolymer latex (G-5) (graft copolymer (A)) and 65% by weight (solid components) of the graft copolymer late;; (G-6) (graft copolymer (B)) obtained by the same manners as in Example 4, the mixture was coagulated with magnesium chloride, and subjected to a heat treatment, a dehydration treatment, and a drying treatment to obtain a powdery graft copolymer.

Then, by following the same procedure as Example 4 except that 15 parts of the above-described powdery graft copolymer in place of 15 parts of the mixed resins of 30% by weight of the graft copolymer (A-4) and 70% by weight of the graft copolymer (B-2) in Example 4, a vinyl chloride-base resin composition was obtained. From the vinyl chloride-base resin composition obtained, Izod test pieces and plates were produced as in Example 4, and the properties of them were determined as in Example 4. The results are shown in Table 2.

EXAMPLE7

In a pressure polymerization vessel equipped with a stirrer were charged 200 parts of water, 0.2 part of sodium oleate, 0.001 part of ferrous sulfate ($FeSO_4.7H_2O$) 0.005 part of EDTA.2Na, 0.1 part of sodium formaldehydesulfoxylate, 0.2 part of potassium tertiary phosphate, 19.8 parts of butadiene, 79.2 parts of butyl acrylate, and 1 part of divinylbenzene, and after raising the temperature of the mixture to 50° C., 0.1 part of di-t-butyl peroxide was added thereto to initiate the polymerization. After passing 1 hour and 30 minutes, 3 hours, and 4 hours and 30 minutes since the initiation of the polymerization, 0.1 part of sodium oleate was added at each time, and after 6 hours since the initiation of the Polymerization, a rubber latex (R-6) containing a rubbery polymer having a polymerization conversion of 99%, a mean particle size of 0.16 μm, and a glass transition temperature of –56° C. was obtained, Then, 210 parts (70 parts of solid components) of the above-described rubber latex (R-6), 200 parts of water, 0.002 part of ferrous sulfate ($FeSO_4.7H_2O$), 0.004 part of EDTA.2Na, and 0.1 part of sodium formaldehydesulfoxylate were changed in a polymerization vessel equipped with a stirrer, and after mixing, the inside temperature of the mixture was raised to 70° C. Thereafter, a mixed liquid of 25 parts of methyl methacrylate, 3 parts of butyl acrylate, 2 parts of acrylonitrile, and 0.1 part of cumene hydroperoxide was continuously added thereto over a period of 4 hours, and a post polymerization was carried out for one hour to obtain a graft copolymer latex (G-7) having a mean particle size of 0.18 μm.

After mixing 30% by weight (solid components) of the graft copolymer latex (G-7) (graft copolymer (A)) obtained with 70% by weight (solid components) of the graft copolymer latex (G-6) (graft copolymer (B)) obtained by the same manner as in Example 4, the mixture was coagulated with magnesium chloride and subjected to a heat treatment, a dehydration treatment, and a drying treatment to obtain a powdery graft copolymer (A-5)

Then, by following the same procedure as Example 4 except that 15 parts of the above-described powdery graft copolymer was used in place of 15 parts of the mixed resins of 30% by weight of the graft copolymer (A-4) and 70% by weight of the graft copolymer (B-2) in Example 4, a vinyl chloride-base resin composition was obtained. From the vinyl chloride-base resin composition obtained, Izod test pieces and plates were produced as in Example 4, and the properties of them were determined as in Example 4. The results are shown in Table 2.

Comparative Example 6

In a polymerization vessel equipped with a stirrer were charged 210 parts (70 parts of solid components) of the rubber latex (R-4) obtained as in Example 4, 200 parts of water, 0.002 part of ferrous sulfate ($FeSO_4.7H_2O$), 0.004 part of EDTA.2Na, and 0.1 part of sodium formaldehydesulfoxylate, and after mixing, the inside temperature of the mixture was raised to 70° C. Thereafter, a mixed liquid of 30 parts of styrene and 0.4 part of cumene hydroperoxide was continuously added thereto over a period of 4 hours, and a post polymerization was carried out for one hour to obtain a graft copolymer latex (G-8) having a mean particle size of 0.27 μm.

The graft copolymer latex (G-8) obtained was coagulated with magnesium chloride and subjected to a heat treatment, a dehydration treatment, and a drying treatment to obtain a powdery graft copolymer (A-6).

On the other hand, 210 parts (70 parts of solid components) of the rubber later (R-5) obtained by the same manner as in Example 4, 200 parts of water, 0.002 part of ferrous sulfate ($FeSO_4.7H_2O$), 0.004 part of EDTA.2Na, and 0.1 part of sodium formaldehydesulfoxylate were charged in a polymerization vessel equipped with a stirrer, and after mixing, the inside temperature of the mixture was raised to 70° C. Thereafter, a mixed liquid of 30 parts of styrene and 0.4 part of cumene hydroperoxide was continuously added thereto over a period of 4 hours, and a post polymerization was carried out for one hour to obtain a graft copolymer latex (G-9) having a mean particle size of 0.08 μm.

The graft copolymer latex (G-9) obtained was coagulated with magnesium chloride and subjected to a heat treatment, a dehydration treatment, and a drying treatment to obtain a powdery graft copolymer (B-3).

Then, By following the same procedure as Example 4 except that 15 parts of the mixed resins of 30% by weight of the graft copolymer (A-6) and 70% by weight of the graft copolymer (B-3) in place of 15 parts of the mixed resins of 30% by weight of the graft copolymer (A-4) and 70% by weight of the graft copolymer (B-2) in Example 4, a vinyl chloride-base resin composition was obtained. From the vinyl chloride-base resin composition obtained, Izod test pieces and plates were produced as in Example 4, and the properties of them were determined as in Example 4, The results are shown in Table 3.

Comparative Example 7

In a pressure polymerization vessel equipped with a stirrer were charged 200 parts of water, 0.044 part of sodium oleate, 0.001 part of ferrous sulfate ($FeSo_4.7H_2O$), 0.005 part of EDTA.2Na, 0.1 part of sodium formaldehydesulfoxylate, 0.2 part of potassium tertiary phosphate, 12.4 parts of butadiene, 28 parts of butyl alcohol, 18.6 parts of methyl methacrylate, 40 parts of styrene, and 1 part of divinylbenzene, and after raising the temperature of the mixture to 50° C., 0.1 part of di-t-butyl peroxide was added thereto to initiate the polymerization. After passing 1 hour and 30 minutes, 3 hours, and 4 hours and 30 minutes since the initiation of the polymerization, 0.1 part of sodium oleate was added at each time, and after 6 hours since the initiation of the polymerization, a latex (R-7) containing a polymer having a polymerization conversion of 99%, a mean particle size of 0.23 μm, and a glass transition temperature of 12° C. was obtained.

Then, 210 parts (70 parts of solid components) of the above-described latex (R-7), 200 parts of water, 0.002 part of ferrous sulfate ($FeSO_4.7H_2O$), 0.004 part of EDTA.2Na, and 0.1 part of sodium formaldehydesulfoxylate were charged in a polymerization vessel equipped with a stirrer, and after mixing, the inside temperature of the mixture was raised to 70° C. Thereafter, a mixed liquid of 25 parts of methyl methacrylate, 3 parts of butyl acrylate, 2 parts of acrylonitrile, and 0.1 part of cumene hydroperoxide was continuously added thereto over a period of 4 hours, and a post polymerization was carried out for one hour to obtain a graft copolymer latex (G-10) having a mean particle size of 0.26 μm.

The graft copolymer latex (G-10) obtained was coagulated with magnesium chloride and subjected to a heat treatment, a dehydration treatment, and a drying treatment to obtain a powdery graft copolymer (A-7).

On the other hand, 200 parts of water, 1.6 parts of sodium oleate, 0.001 part of ferrous sulfate ($FeSO_4.7H_2O$), 0.005 part of EDTA.2Na, 0.1 part of sodium formaldehydesulfoxylate, 0.2 part of potassium tertiary phosphate, 12.4 parts of butadiene, 28 parts of butyl acrylate, 18.6 parts of methyl methacrylate, 40 parts of styrene, and 1 part of divinylbenzene were charged in a pressure polymerization vessel equipped with a stirrer, and after raising the temperature of the mixture in the vessel to 50° C., 0.1 part of di-t-butyl peroxide was added to initiate the polymerization. After passing 1 hour and 30 minutes, 3 hours, and 4 hours and 30 minutes since the initiation of the polymerization, 0.3 part of sodium oleate was added at each time, and after 6 hours since the initiation of the polymerization, a latex (R-8) containing a polymer having a polymerization conversion of 99%, a mean particle size of 0.06 μm, and a glass transition temperature of 12° C. was obtained.

Then, 210 parts (70 parts of solid components) of the above-described latex (R-8), 200 parts of water, 0.002 part of ferrous sulfate ($FeSO_4.7H_2O$), 0.004 part of EDTA.2Na, and 0.1 part of sodium formaldehydesulfoxylate were charged in a polymerization vessel equipped with a stirrer, and after mixing, the inside temperature of the mixture was raised to 70° C. Thereafter, a mixed liquid of 25 parts of methyl methacrylate, 3 parts of butyl acrylate, 2 parts of acrylonitrile, and 0.1 part of cumene hydroperoxide was continuously added thereto over a period of 4 hours, and a post polymerization was carried out for one hour to obtain a graft polymer latex (G-11) having a mean particle size of 0.07 μm.

The graft copolymer latex (G-11) obtained was coagulated with magnesium chloride and subjected to a heat treatment, a dehydration treatment, and a drying treatment to obtain a powdery graft polymer (B-4).

Then, by following the same procedure as Example 4 except that 15 parts of the mixed resins of 30% by weight of the graft copolymer (A-7) and 70% by weight of the graft copolymer (B-4) were used in place of 15 carts of the mixed resins of 30% by weight of the graft copolymer (A-4) and 70% by weight of the graft copolymer (B-2) in Example 4, a vinyl chloride-base resin composition was obtained. From the vinyl chloride-base resin composition obtained, Izod test pieces and plates were produced as in Example 4, and the properties of them were determined as in Example 4. The results are shown in Table 3.

Comparative Example 8

By by following the same procedure as Example 4 except that 15 parts of the mixed resins of 70% by weight of the graft copolymer (A-4) and 30% by weight of the graft copolymer (B-2) were used in place of 15 parts of the mixed resins of 30% by weight of the graft copolymer (A-4) and 70% by weight of the graft copolymer (B-2) in Example 4, a vinyl chloride-base resin composition was obtained, From the vinyl chloride-base resin composition obtained, Izod test pieces and plates were produced as in Example 4, and the properties of them were determined as in Example 4. The results are shown in Table 3.

Comparative Example 9

Then, by following the same procedure as Example 4 except that 15 parts of the graft copolymer (A-4) only was used in place of 15 parts of the mixed resins of 30% by weight of the graft copolymer (A-4) and 70% by weight of the graft copolymer (B-2) in Example 4, a vinyl chloride-base resin composition was obtained. From the vinyl chloride-base resin composition obtained, Izod test pieces and plates were produced as in Example 4, and the properties of them were determined as in Example 4. The results are shown in Table 3.

Comparative Example 10

Then, by following the same procedure as Example 4 except that 15 parts of the graft copolymer (B-2) only was used in place of 15 parts of the mixed resins of 30% by weight of the graft copolymer (A-4) and 70% by weight of the graft copolymer (B-2) in Example 4, a vinyl chloride-base resin composition was obtained. From the vinyl chloride-base resin composition obtained, Izod test pieces and plates were produced as in Example 4, and the properties of them were determined as in Example 4. The results are shown in Table 3.

Comparative Example 11

In a polymerization vessel equipped with a stirrer were charged 210 parts (70 parts of solid components) of the rubber latex (R-5) obtained by the same manner as in Example 4, 200 parts of water, 0.002 part of ferrous sulfate ($FeSO_4 \cdot 7H_2O$), 0.004 part of EDTA.2Na, and 0.1 part of sodium formaldehydesulfoxylate, and after mixing, the inside temperature of the mixture was raised to 70° C. Then, after adding thereto 0.23 part (1% aqueous solution) of hydrochloric acid over a period of one hour, 0.3 part of sodium hydroxide was added thereto. Thereafter, a mixed liquid of 25 parts of methyl methacrylate, 3 parts of butyl acrylate, 2 parts of acrylonitrile, and 0.1 part of cumene hydroperoxide was continuously added thereto over a period of 4 hours, and a post polymerization was carried out for one hour to obtain a graft copolymer latex (G-12) having a mean particle size of 0.24 μm.

The graft copolymer latex (G-12) obtained was coagulated with magnesium chloride and subjected to a heat treatment, a dehydration treatment, and a drying treatment to obtain a powdery graft copolymer.

Then, by following the same procedure as Example 4 except that 15 parts of the above-described graft copolymer was used in place of 15 parts of the mixed resins of 30% by weight of the graft copolymer (A-4) and 70% by weight of the graft copolymer (B-2) in Example 4, a vinyl chloride-base resin composition was obtained. From the vinyl chloride-base resin composition obtained, Izod test pieces and plates ware produced as in Example 4, and the properties of them were determined as in Example 4. The results are shown in Table 3.

Comparative Example 12

In a polymerization vessel equipped with a stirrer were charged 90 parts (30 parts of solid components) of the rubber latex (R-6) obtained by the same manner as in Example 7, 200 parts of water, 0.002 part of ferrous sulfate ($FeSO_4 \cdot 7H_2O$), 0.004 part of EDTA.2Na, and 0.2 part of sodium formaldehydesulfoxylate, and after mixing, the inside temperature of the mixture was raised to 70° C. Thereafter, a mixed liquid of 58.3 parts of methyl methacrylate, 7 parts of butyl acrylate, 4.7 parts of acrylonitrile, and 0.23 part of cumene hydroperoxide was continuously added thereto over a period of 9 hours. After passing 3 hours and 6 hours since the initiation of the polymerization, 0.1 part of sodium oleate was added at each time. Then, a post polymerization was carried out for one hour to obtain a graft copolymer latex (G-13) having a mean particle size of 0.25 μm.

Then, 90 parts (30 parts of solid components) of the rubber latex (R-5) obtained by the same manner as in Example 4, 200 parts of water, 0.002 part of ferrous sulfate ($FeSO_4 \cdot 7H_2O$), 0.004 part of EDTA.2Na, and 0.2 part of sodium formaldehydesulfoxylate were charged in a polymerization vessel equipped with a stirrer, and after mixing, the inside temperature of the mixture was raised to 70° C. Thereafter, a mixed liquid of 59.3 parts of methyl methacrylate, 7 parts of butyl acrylate, 4.7 parts of acrylonitrile, and 0.23 part of cumene hydroperoxide was continuously added thereto over a period of 9 hours. After passing 3 hours and 6 hours since the initiation of the polymerization, 0.4 part of sodium oleate was added at each time. Then, a post polymerization was carried out for one hour to obtain a graft copolymer latex (G-14) having a mean particle size of 0.10 μm.

After mixing 30% by weight (solid components) of the graft copolymer latex (G-13) (graft copolymer (A)) and 70% by weight (solid components) of the graft copolymer latex (G-14) (graft copolymer (B)) obtained as described above, the mixture was coagulated with magnesium chloride and subjected to a heat treatment, a dehydration treatment, and a drying treatment to obtain a powdery graft copolymer.

Then by following the same procedure as Example 4 except that 15 parts of the above-described powdery graft copolymer was used in place of 15 parts of the mixed resins of 30% by weight of the graft copolymer (A-4) and 70% by weight of the graft copolymer (B-2) in Example 4, a vinyl chloride-base resin composition was obtained. From the vinyl chloride-base resin composition obtained, Izod test pieces and plates were produced as in Example 4, and the properties of them were determined as in Example 4. The results are shown in Table 3.

TABLE 1

| | Graft Copolymer | | | | | | Property of Pipe | |
|---|---|---|---|---|---|---|---|---|
| | Graft Copolymer (A) | | Graft Copolymer (B) | | | | | |
| | Content of Rubbery Copolymer (a') (wt. %) | Mean Particle Size (μm) | Content of Rubbery Copolymer (a') (wt. %) | Mean Particle Size (μm) | Mixing Method | Graft Copolymer (A)/Graft Copolymer (B) (weight ratio) | Falling Weight Strength H₅₀ (m) | Charpy Strength (kJ/m²) |
| Ex. 1 | 80 | 0.24 | 80 | 0.09 | Po. Mix. | 20/80 | 3.40 | 110 |
| 2 | 80 | 0.24 | 80 | 0.09 | Po. Mix. | 45/55 | 3.10 | 110 |
| 3 | 80 | 0.24 | 80 | 0.09 | La. Mix. | 10/90 | 3.50 | 100 |
| C. Ex. | | | | | | | | |
| 1 | — | — | 80 | 0.09 | — | 0/100 | 3.00 | 30 |
| 2 | 80 | 0.24 | — | — | — | 100/0 | 1.80 | 80 |
| 3 | 80 | 0.37 | — | — | — | 100/0 | 1.50 | 90 |
| 4 | 80 | 0.24 | 80 | 0.09 | Po. Mix. | 60/40 | 2.20 | 70 |
| 5 | — | — | 80 | 0.09 | — | 0/100 | 2.10 | 40 |

C. Ex.: Comparative Example
Po. Mix.: Powder mixture
La. Mix.: Latex mixture

TABLE 2

| | Graft Copolymer | | | | | | | Property of Molded Product | | |
|---|---|---|---|---|---|---|---|---|---|---|
| | Graft Copolymer (A) | | Graft Copolymer (B) | | | | | | Izod Strength | |
| Example No. | Content of Rubbery Copolymer (a') (wt %) | Mean Particle Size (μm) | Content of Rubbery Copolymer (a') (wt %) | Mean Particle Size (μm) | Mixing Method | Graft copolymer (A)/Graft Copolymer (B) (Weight ratio) | Feature | Plane Impact Strength (*) | 23° C. (kJ/m²) | 0° C. (kJ/m²) |
| 4 | 70 | 0.27 | 70 | 0.08 | Po. Mix. | 30/70 | — | 85% | 70 | 11.4 |
| 5 | 70 | 0.27 | 70 | 0.08 | S. Mix. | 15/85 | — | 85% | 60 | 10.2 |
| 6 | 70 | 0.27 | 70 | 0.08 | La. Mix. | 35/65 | — | 75% | 70 | 11.2 |
| 7 | 70 | 0.18 | 70 | 0.08 | La. Mix. | 30/70 | — | 85% | 65 | 10.6 |

(*) Ductile breaking ratio
Po. Mix.: Powder mixture,
S. Mix.: Slurry mixture,
La. Mix.: Latex mixture

TABLE 3

| | Graft Copolymer | | | | | | | Property of Molded Product | | |
|---|---|---|---|---|---|---|---|---|---|---|
| | Graft Copolymer (A) | | Graft Copolymer (B) | | | | | | Izod Strength | |
| Example No. | Content of Rubbery Copolymer (a') (wt %) | Mean Particle Size (μm) | Content of Rubbery Copolymer (a') (wt %) | Mean Particle Size (μm) | Mixing Method | Graft copolymer (A)/Graft Copolymer (B) (Weight ratio) | Feature | Plane Impact Strength (*) | 23° C. (kJ/m²) | 0° C. (kJ/m²) |
| 6 | 70 | 0.27 | 70 | 0.08 | Po. Mix. | 30/70 | (a) | 5% | 11 | 6.9 |
| 7 | 70 | 0.26 | 70 | 0.07 | La. Mix. | 30/70 | (b) | 0% | 8.4 | 6.7 |
| 8 | 70 | 0.27 | 70 | 0.08 | Po. Mix. | 70/30 | — | 35% | 50 | 10.5 |
| 9 | 70 | 0.27 | — | — | — | 100/0 | — | 15% | 55 | 9.5 |
| 10 | — | — | 70 | 0.08 | — | 0/100 | — | 80% | 20 | 8.1 |
| 11 | 70 | 0.24 | — | — | — | 0/100 | (c) | 30% | 50 | 10.1 |
| 12 | 30 | 0.25 | 30 | 0.10 | La. Mix. | 30/70 | — | 25% | 30 | 7.6 |

From the results shown in Table 1, it can be seen that the pipes produced by forming the vinyl chloride-base resin compositions of the invention obtained in Examples 1 to 3 have the drop-dart strength of at least 3.00 m, the Charpy strength of at least 100 kJ/m², and a good balance of both strengths as compared with the pipes of Comparative Examples 1 to 5.

Also, from the results shown in Table 2 and Table 3, it can be seen that in each of the Izod test pieces and plates produced by molding each of the vinyl chloride-base resin compositions of the invention obtained in Examples 4 to 7, the Izod strength is at least 60 KJ/m² (23° C.) and at least 10 kJ/m² (0° C.), the plane impact strength (ductile fracture ratio) is at least 75%, and the balance of both the strengths is good, as compared with the Izod test pieces and plates of Comparative Examples 6 to 12.

Industrial Applicability

The vinyl chloride-base resin composition of the invention has a good balance of the drop-dart strength, which is the typical example of the evaluation of ductile fracture and the Charpy strength, which is the typical example of the evaluation of brittle fracture, is excellent in the impact strength, and has the effect capable of being suitably used for the production of molded materials such as pipes, window frames, joints, fences, doors, switch boxes, etc., by, for example, an extrusion molding method, an injection molding method, etc.

What is claimed:

1. A vinyl chloride-based resin composition characterized by mixing from 1 to 30% by weight of a graft copolymer composition and from 99 to 70% by weight of a vinyl chloride-base resin composition (C), wherein the sum total of both the compositions is 100% by weight, said graft copolymer composition comprising a mixture of a graft copolymer (A);
   (i) containing a rubbery polymer (a') in an amount of from 50 to 90% by weight obtained by polymerizing a monomers mixture (a) comprising from 50 to 100% by weight of a monomer (a-1) constituted of a butadiene monomer and an alkyl ester of acrylic acid monomer, from 0 to 50% by weight of an aromatic vinyl monomer (a-2), from 0 to 20% by weight of a vinyl monomer (a-3) copolymerizable with the monomer (a-1) and the monomer (a-2), and from 0 to 5% by weight of a non-conjugated multifunctional monomer (a-4); and having a glass transition temperature of not higher than 0° C.;
   (ii) containing polymer (b') in an amount of from 10 to 50% by weight obtained by polymerizing a monomer or mixture (b) comprising from 10 to 100% weight of a alkyl ester of methacrylic acid monomer (b-1), from 0 to 60% by weight of an alkyl ester of acrylic acid monomer (b-2), from 0 to 90% by weight of an aromatic monomer (b-3), from 0 to 25% by weight of a vinyl cyanide monomer (b-4), and from 0 to 20% by weight of a vinyl monomer (b-5) copolymerizable with the monomer (b-3) and the monomer (b-4); (wherein, the sum total of the rubbery polymer (a') and the polymer (b') is 100% by weight); and
   (iii) having a mean volume average particle size of at least 0.15 mm; said graft copolymer (A) being obtained by graft copolymerizing the monomer mixture (b) to the rubbery polymer (a') as the trunk polymer, and a graft copolymer (B);
   (i) containing the above-described rubbery polymer (a') in an amount of from 50 to 90% by weight;
   (ii) containing the above-described polymer (b') in an amount of from 10 to 50% by weight (wherein, the sum total of the rubbery polymer (a') and the polymer (b) is 100% by weight), and
   (iii) having a mean volume average particle size of from 0.03 to 0.13 mm; said graft copolymer (B) being obtained by graft copolymerizing the monomer mixture (b) to the rubbery polymer (a') as the trunk polymer; wherein
the graft copolymer (A) contains at least 5% by weight and less than 50% by weight of the sum total amounts of the graft copolymer (A) and the graft copolymer (B).

2. The vinyl chloride-based resin composition according to claim 1, wherein the graft copolymer (A) contains from 10 to 40% by weight of the sum total amounts of the graft copolymer (A) and the graft copolymer (B).

3. The vinyl chloride-based resin composition according to claim 2, wherein the graft copolymer (A) contains 15 to 35% by weight of the stun total amounts of the graft copolymer (A) and the graft copolymer (B).

4. The vinyl chloride-based resin composition according to claim 1, wherein the mean particle size of the graft copolymer (A) is from 0.16 to 0.5 mm.

5. The vinyl chloride-based resin composition according to claim 4, wherein the mean particle size of the graft copolymer (A) is from 0.17 to 0.28 mm.

6. The vinyl chloride-based resin composition according to claim 1, wherein the mean particle size of the graft copolymer (B) is from 0.05 to 0.12 mm.

7. The vinyl chloride-based resin composition according to claim 1, wherein the monomer (a-1) is constituted of from 0 to 25% by weight of a butadiene monomer and from 75 to 100% by weight of an alkyl ester of acrylic acid monomer (wherein the sum total of both the monomers is 100% by weight).

8. The vinyl chloride-based resin composition according to claim 7, wherein the monomer (a-1) is constituted of the alkyl ester of acrylic acid monomer only.

9. The vinyl chloride-based resin composition according to claim 1, wherein the monomer mixture (a) does not contain the aromatic vinyl monomer (a-2).

10. The vinyl chloride-based resin composition according to claim 1, wherein the monomer mixture (a) does not contain the vinyl monomer (a-3).

11. The vinyl chloride-based resin composition according to claim 1, wherein the ratio of the non-conjugated multifunctional monomer (a-4) contained in the monomer mixture (a) is from 0.1 to 3% by weight.

12. The vinyl chloride-based resin composition according to claim 1, wherein the alkyl ester of methacrylic acid monomer (b-1) contains a methyl methacrylic monomer in an amount of from 60 to 100% by weight.

13. The vinyl chloride-based resin composition according to claim 12, wherein the alkyl ester of methacrylic acid monomer (b-1) contains a methyl methacrylate monomer in an amount of from 80 to 100% by weight.

14. The vinyl chloride-based resin composition according to claim 1, wherein the monomer mixture (b) contains methyl methacrylate monomer (b-1) and the alkyl ester of acrylic acid monomer (b-2) in an amount of from 60 to 100% by weight and in an amount of from 0 to 40% by weight, respectively.

15. The vinyl chloride-based resin composition according to claim 1, wherein the monomer mixture (b) contains the aromatic vinyl monomer (b-3) in an amount of from 0 to 10% by weight.

16. The vinyl chloride-based resin composition according to claim 15, wherein the monomer mixture (b) does not contain the aromatic vinyl monomer (b-3).

17. The vinyl chloride-based resin composition according to claim 1, wherein the monomer mixture (b) does not contain the vinyl cyanide monomer (b-4).

18. The vinyl chloride-based resin composition according to claim 1, wherein the monomer mixture (b) does not contain the vinyl monomer (b-5).

19. A molded material obtained by molding the vinyl chloride-base resin composition described in above-described claim 1.

* * * * *